(12) United States Patent
Alfoudari

(10) Patent No.: US 10,391,461 B2
(45) Date of Patent: Aug. 27, 2019

(54) BABY BOTTLE WITH MIXER

(71) Applicant: Abdulrazzaq A. A. E. A. Alfoudari, Safat (KW)

(72) Inventor: Abdulrazzaq A. A. E. A. Alfoudari, Safat (KW)

(*) Notice: Subject to any disclaimer, the term of this patent is extended or adjusted under 35 U.S.C. 154(b) by 0 days.

(21) Appl. No.: 16/177,364

(22) Filed: Oct. 31, 2018

(65) Prior Publication Data

US 2019/0176110 A1    Jun. 13, 2019

Related U.S. Application Data

(60) Provisional application No. 62/597,277, filed on Dec. 11, 2017.

(51) Int. Cl.
| | | |
|---|---|---|
| *A47J 43/046* | (2006.01) |
| *B01F 7/16* | (2006.01) |
| *A61J 11/00* | (2006.01) |
| *A61J 9/06* | (2006.01) |
| *B01F 15/00* | (2006.01) |
| *B01F 15/06* | (2006.01) |
| *A61J 9/02* | (2006.01) |
| *H02J 7/00* | (2006.01) |

(52) U.S. Cl.
CPC ............ *B01F 7/162* (2013.01); *A61J 9/02* (2013.01); *A61J 9/0623* (2015.05); *A61J 11/008* (2013.01); *B01F 15/00207* (2013.01); *B01F 15/00253* (2013.01); *B01F 15/00396* (2013.01); *B01F 15/00519* (2013.01); *B01F 15/00974* (2013.01); *B01F 15/065* (2013.01); *A61J 2200/42* (2013.01); *A61J 2200/44* (2013.01); *B01F 2015/061* (2013.01); *B01F 2015/062* (2013.01); *B01F 2215/0022* (2013.01); *H02J 7/0042* (2013.01)

(58) Field of Classification Search
CPC ..................................................... A47J 43/046
USPC ................................................. 366/130, 314
See application file for complete search history.

(56) References Cited

U.S. PATENT DOCUMENTS

| 5,609,759 A * | 3/1997 | Nohren, Jr. ............. C02F 1/003 210/266 |
| 6,037,872 A | 3/2000 | Dunnum | |
| 6,104,292 A * | 8/2000 | Rombom .................. A61J 9/00 340/573.1 |

(Continued)

FOREIGN PATENT DOCUMENTS

CN    204840329 U    12/2015

*Primary Examiner* — David L Sorkin
(74) *Attorney, Agent, or Firm* — Richard C. Litman

(57) ABSTRACT

The baby bottle with mixer is an infant feeding bottle with an integral, controllable internal mixer. The baby bottle with a mixer includes a conventional bottle having an open upper end and a closed lower end, and a conventional cap for releasably covering and sealing the open upper end of the bottle. An internal wall is mounted within the bottle such that a fluid-tight chamber is defined between a lower surface of the internal wall and the closed lower end of the bottle. An agitator is rotatably mounted on an upper surface of the internal wall, and the agitator is selectively driven by a motor, which is housed within the fluid-tight chamber. A speaker is mounted on the closed lower end of the bottle for playing music, soothing sounds or the like while the baby is being fed. A controller is in communication with the speaker and the motor.

8 Claims, 5 Drawing Sheets

(56) References Cited

U.S. PATENT DOCUMENTS

| | | |
|---|---|---|
| 7,061,832 B1 | 6/2006 | Lansing |
| 7,134,932 B1 | 11/2006 | Carrasco et al. |
| D668,972 S | 10/2012 | Solly et al. |
| 8,851,739 B2 | 10/2014 | Gonzalez |
| 10,004,665 B2 * | 6/2018 | Maldonado ............ A61J 1/1406 |
| 2002/0077018 A1 * | 6/2002 | Rice .......................... A61J 9/00 |
| | | 446/74 |
| 2004/0178162 A1 * | 9/2004 | Zucker-Franklin ......................... |
| | | A61J 11/0025 |
| | | 215/11.1 |
| 2007/0005006 A1 * | 1/2007 | Rosenfeld ............ A61J 11/0025 |
| | | 604/73 |
| 2009/0224112 A1 * | 9/2009 | Carrasco .................. A61J 9/06 |
| | | 248/104 |
| 2010/0193459 A1 | 8/2010 | Housley |
| 2011/0233118 A1 | 9/2011 | Nelson |
| 2014/0305927 A1 * | 10/2014 | Alexander ........... A47G 19/027 |
| | | 219/387 |
| 2015/0078142 A1 | 3/2015 | Loomis |
| 2015/0165402 A1 | 6/2015 | King |
| 2015/0283037 A1 | 10/2015 | Trejo |
| 2016/0354740 A1 * | 12/2016 | Gonzalez .............. A61J 9/0623 |

\* cited by examiner

BABY BOTTLE WITH MIXER

CROSS-REFERENCE TO RELATED APPLICATION

This application claims the benefit of U.S. Provisional Patent Application Ser. No. 62/597,277, filed on Dec. 11, 2017.

BACKGROUND

1. Field

The disclosure of the present patent application relates to baby bottles and the like, and particularly to a baby bottle with mixer having an integral, controllable internal mixer.

2. Description of The Related Art

When mixing infant formula in an ordinary baby bottle, the formula is typically put in the bottle and, once capped, the bottle is manually shaken in order for the solution to thoroughly mix. Manual shaking, however, is often inefficient, resulting in undissolved chunks of formula remaining within the baby bottle. Without thorough mixing, the infant receives fewer nutrients. Additionally, the remaining chunks in the formula may clog the feeding nipple. In addition to the above, manual shaking of the formula often results in the creation of air bubbles within the liquid, thereby increasing the likelihood of post-feeding discomfort symptoms, such as gas, colic and other discomforts. Thus, a baby bottle with mixer solving the aforementioned problems is desired.

SUMMARY

The baby bottle with mixer is an infant feeding bottle having an integral, controllable internal mixer. The baby bottle with mixer includes a conventional bottle having an open upper end and a closed lower end, and a conventional cap for releasably covering and sealing the open upper end of the bottle. The cap has a central aperture formed therein, which is covered by a conventional feeding nipple. A filter housing is preferably secured to an inner surface of the cap for removably receiving a filter.

An internal wall is mounted within the bottle such that a fluid-tight chamber is defined between a lower surface of the internal wall and the closed lower end of the bottle. An agitator is rotatably mounted on an upper surface of the internal wall, and the agitator is selectively driven by a motor, which is mounted within the fluid-tight chamber. The motor is mechanically coupled with the agitator, such as by a drive shaft or the like projecting through the internal wall, for selectively driving rotation of the agitator.

A speaker is further mounted to the closed lower end of the bottle for playing music, soothing sounds or the like while the baby is being fed. A controller is housed within the fluid-tight chamber and is in communication with the speaker and the motor. The controller selectively generates audio signals for the speaker to play, as well as selectively generating motor actuation signals to selectively actuate the motor. Additionally, a thermoelectric element is preferably mounted on the upper surface of the internal wall. The controller is also in communication with the thermoelectric element for selectively generating temperature regulation signals for selective heating and cooling of the thermoelectric element, allowing the user to selectively control the temperature of milk, formula or the like, which is stored within the bottle.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
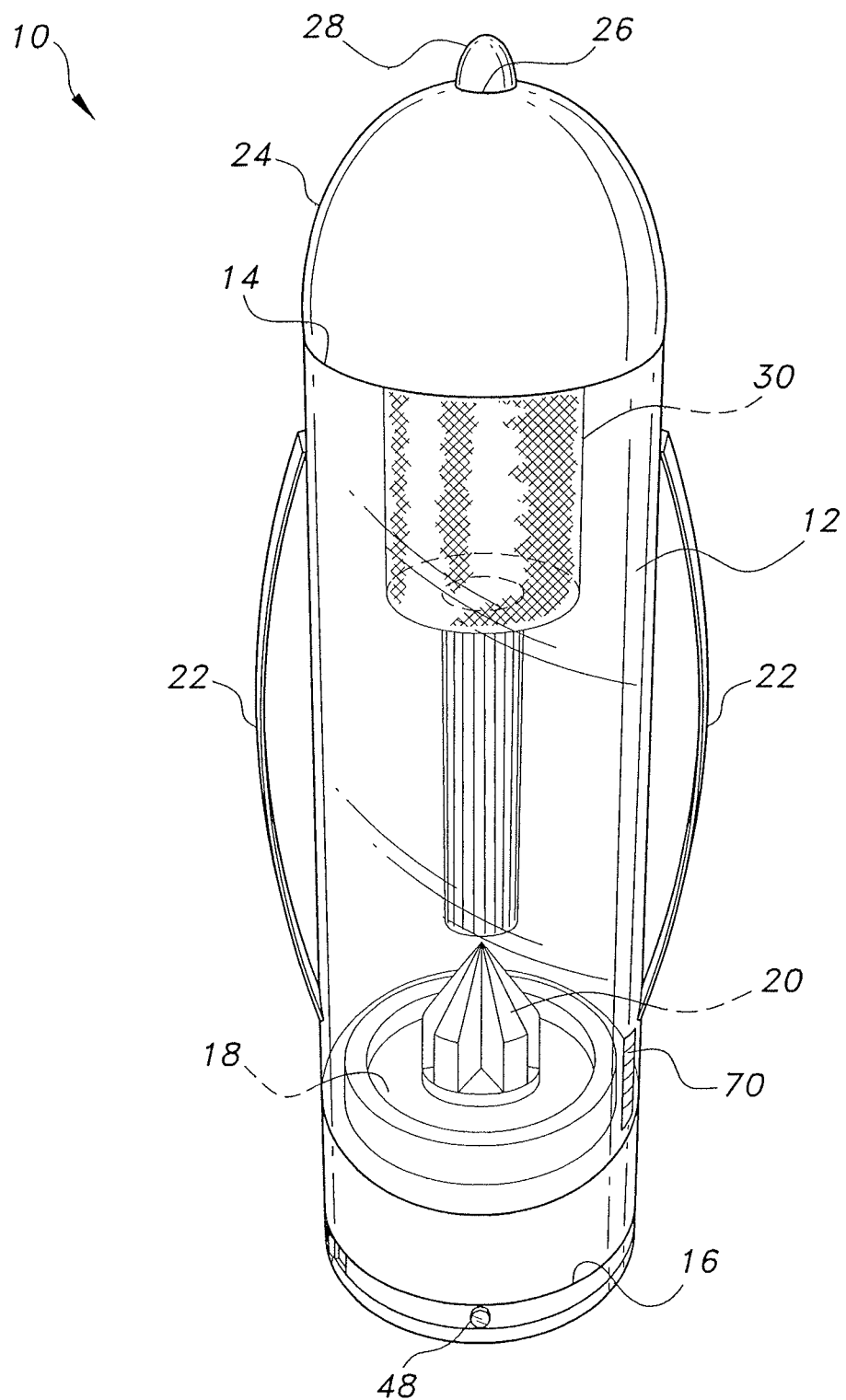
FIG. 1 is a perspective view of a baby bottle with mixer.
Figure 2:
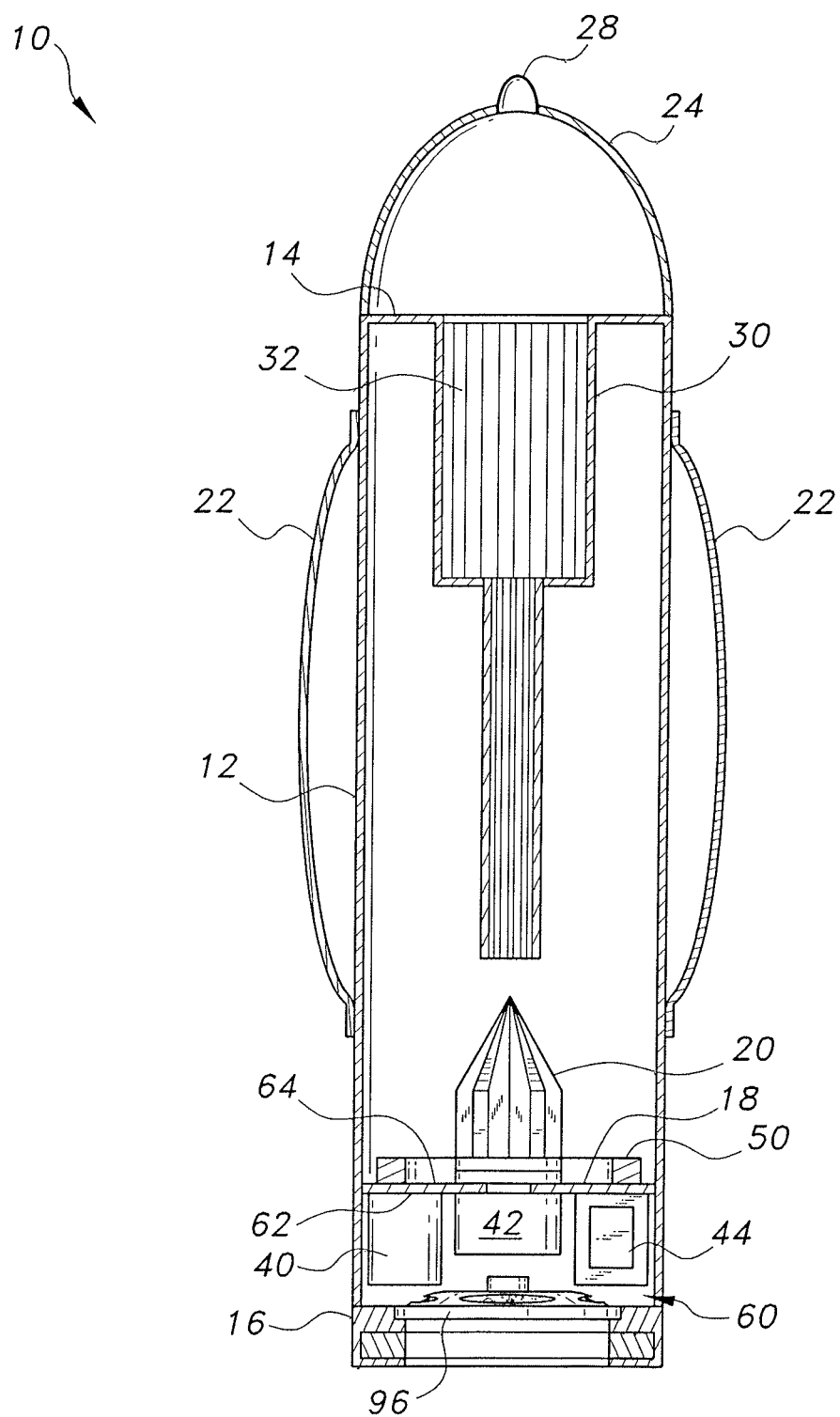
FIG. 2 is a side view in section of the baby bottle with mixer.

The baby bottle with mixer, designated generally as 10 in the drawings, is an infant feeding bottle with an integral, controllable internal mixer. As shown in FIGS. 1 and 2, the baby bottle with mixer 10 includes a bottle 12, having an open upper end 14, a closed lower end 16, and a conventional cap 24 for releasably covering and sealing the open upper end 14 of the bottle 12. The cap 14 has a central aperture 26 formed therein, which is covered by a conventional feeding nipple 28. A filter housing 30 is preferably secured to an inner surface of the cap 24 for removably receiving a filter 32. It should be understood that the overall size, shape and relative dimensions of bottle 12 and cap 14 are shown for exemplary purposes only. It should be further understood that any suitable type of feeding nipple 28, as are well known in the art of infant feeding bottles, may be utilized. Further, it should be understood that any suitable type of replaceable filter 32 may be used for filtering the milk, infant formula or the like, which is stored within the bottle 12, and that the filter 32 and its corresponding housing 30 are shown for exemplary purposes only. Further, as shown, the bottle 12 may have one or more handles 22 for gripping by the user. It should be understood that handles the 22 are shown for exemplary purposes only.

As best shown in FIG. 2, an internal wall 18 is mounted within the bottle 12 such that a fluid-tight chamber 60 is defined between a lower surface 62 of the internal wall 60 and the closed lower end 16 of the bottle 12 and a liquid reservoir is defined between the internal wall and the open upper end for storing milk, infant formula, juice, or other liquids for administration to the infant. An agitator 20 is rotatably mounted on an upper surface 64 of the internal wall 60, and the agitator 20 is selectively driven by a motor 42, which is mounted within the fluid-tight chamber 60. The motor 42 is mechanically coupled with the agitator 20, such as by a drive shaft or the like projecting through the internal wall 18, for selectively driving rotation of the agitator 20. It should be understood that the agitator 20 is shown for exemplary purposes only, and that any suitable type of agitator or mixing element may be used, as are well known in the art of mixers, blenders and the like.

Figure 3:
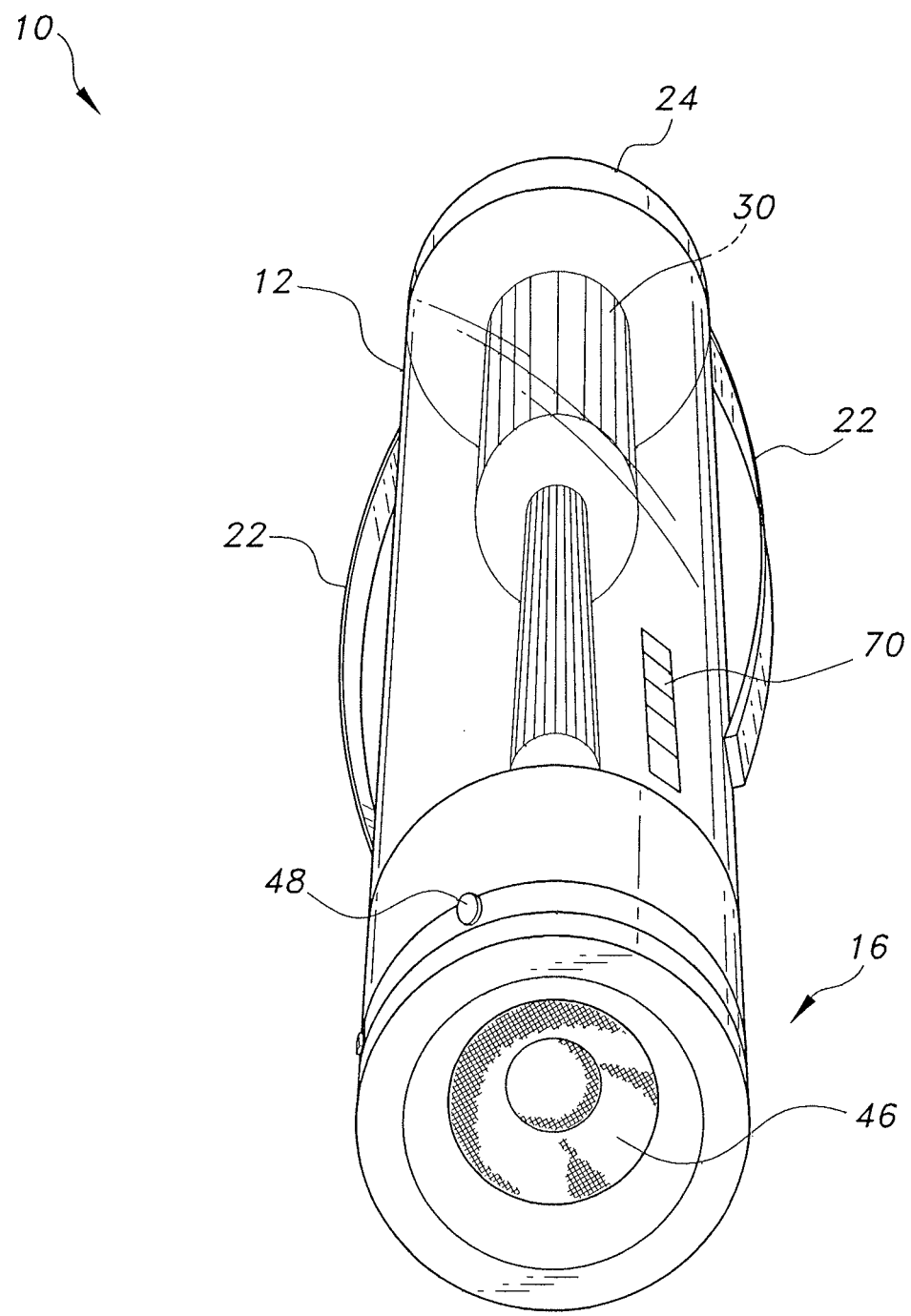
FIG. 3 is a perspective view of the baby bottle with mixer as seen from below.
Figure 5:
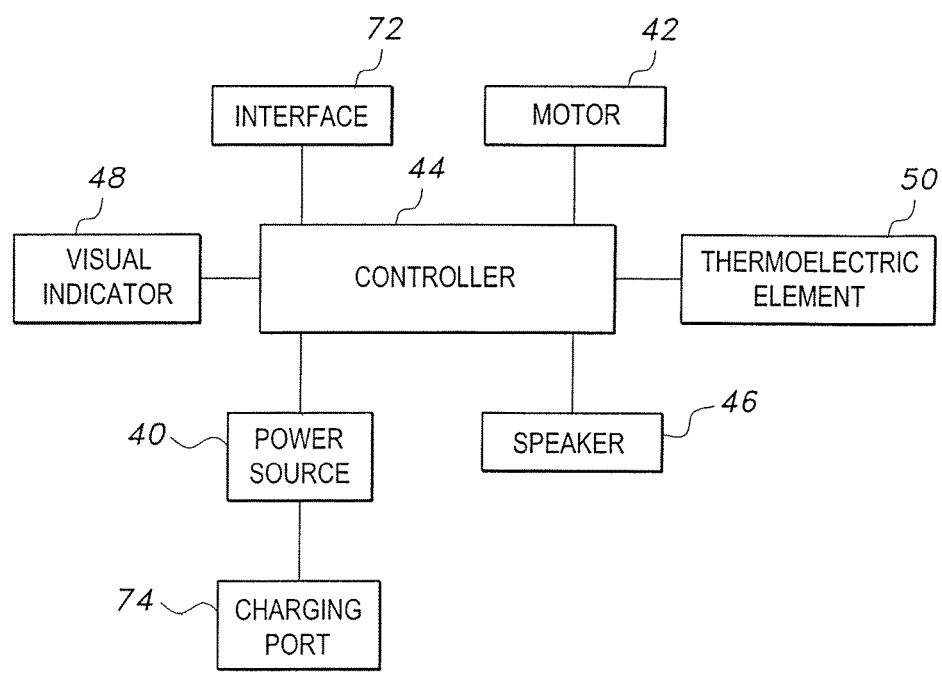
FIG. 5 is a block diagram illustrating electrical components of the baby bottle with mixer.

As best shown in FIG. 3, a speaker 46 is mounted to the closed lower end 16 of the bottle 12 for playing music, soothing sounds, or the like while the baby is being fed. It should be understood that any suitable type of speaker may be utilized. As shown in FIGS. 2 and 5, a controller 44 is housed within the fluid-tight chamber and is in communication with the speaker 46 and the motor 42. The controller 44 selectively generates audio signals for the speaker 46 to play, as well as selectively generating motor actuation signals to selectively actuate the motor 42. It should be understood that the controller 44 may be any suitable type of controller, such as a microprocessor, microcontroller, programmable logic controller, or the like. It should be further understood that the audio being transmitted to the speaker 46 may be pre-programmed on the controller 44, or may be recorded thereon by the user, for example in MP3 format.

Additionally, as shown in FIGS. 2 and 5, a thermoelectric element 50 is preferably mounted on the upper surface 64 of the internal wall 18. The controller 44 is also in communication with the thermoelectric element 50 for selectively generating temperature regulation signals for selective heating and cooling of the thermoelectric element 50, allowing the user to selectively control the temperature of milk, infant formula, or the like, which is stored within the bottle 12. It should be understood that the thermoelectric element 50 may be any suitable type of controllable heater and cooler, such as a Peltier device, thermoelectric heat pump or the like. Preferably, a thermometer 70 is mounted on the bottle 12, allowing the user to easily determine the temperature of the liquid in the bottle 12. It should be understood that the thermometer 70 may be any suitable type of thermometer. Alternatively, the thermometer 70 could be replaced by an electronic temperature sensor, which could be coupled to the controller 44 for automatic temperature regulation.

In addition to the speaker 46, a visual indicator 48 is also preferably mounted on bottle 12 for providing feedback to the user. As an example, the controller 44, which is in communication with the visual indicator 48, may include a timer or timer circuit, and the visual indicator 48 may be used as a visual alarm for feeding times, for example. Visual indicator 48 may be a light-emitting diode (LED) or any other suitable type of light generating element or display element.

Figure 4:
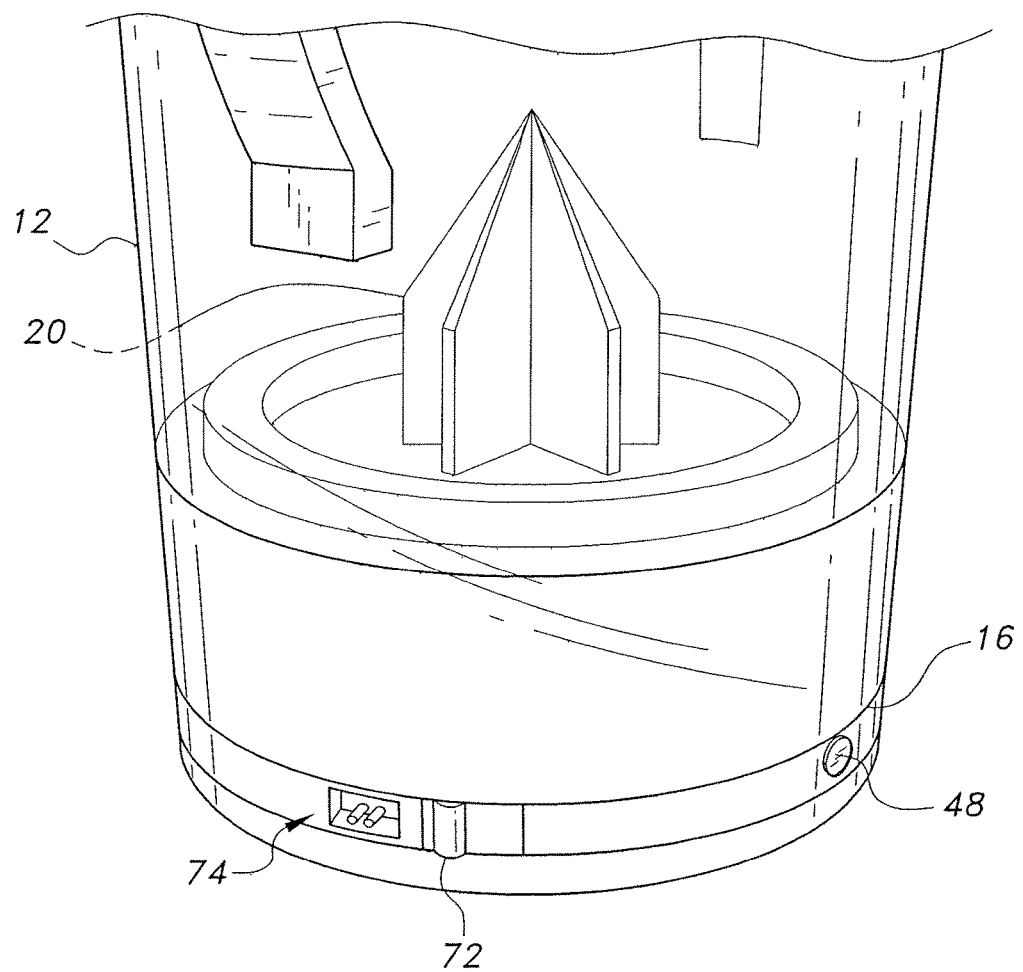
FIG. 4 is a partial perspective view of the baby bottle with mixer.

A power source 40, such as a rechargeable battery, is housed within the fluid-tight chamber 60 for powering the controller 44, motor 42, speaker 46, thermoelectric element 50 and visual indicator 48. As shown in FIG. 4, a charging port 74, such as a universal serial bus (USB) port or the like, is provided for recharging the power source 40. The port 74 may also be used for programming the controller 44. An interface 72, shown in FIG. 4 as an exemplary switch, is provided for allowing the user to control the power and functions of the baby bottle with mixer 10.

It is to be understood that the baby bottle with mixer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A baby bottle with a mixer, comprising:
   a bottle having an open upper end and a closed lower end;
   a cap having a central aperture formed therein, the cap being adapted for releasably covering and sealing the open upper end of the bottle;
   a feeding nipple disposed over the central aperture formed through the cap for selectively dispensing liquid contained in the bottle to a baby;
   a filter housing secured to an inner surface of the cap and extending toward the closed lower end;
   a filter removably received within the filter housing;
   an internal wall mounted within the bottle such that a fluid-tight chamber is defined between the internal wall and the closed lower end of the bottle and a liquid reservoir for containing milk and other liquids for administration to the baby is defined between the internal wall and the open upper end;
   an agitator rotatably mounted on an upper surface of the internal wall and extending into the liquid reservoir a distance to be adjacent the filter housing for mixing formula in the liquid reservoir;
   a motor mounted within the fluid-tight chamber, the motor being mechanically coupled with the agitator for selectively driving rotation thereof; and
   a controller in communication with the motor, the controller selectively generating motor actuation signals to selectively actuate the motor.

2. The baby bottle as recited in claim 1, further comprising:
   a speaker mounted on the closed lower end of the bottle; and
   a thermoelectric element mounted on the upper surface of the internal wall, the controller further selectively generating audio signals coupled to the speaker for playback, the controller further selectively generating temperature regulation signals coupled to the thermoelectric element for selectively heating and cooling liquids in the liquid reservoir.

3. The baby bottle as recited in claim 2, wherein the controller selectively generates audio signals coupled to the speaker for playback.

4. The baby bottle as recited in claim 1, further comprising a thermometer mounted on the bottle.

5. The baby bottle as recited in claim 1, further comprising a temperature sensor mounted in the bottle, the temperature sensor being in electrical communication with the controller.

6. The baby bottle as recited in claim 1, further comprising a visual indicator mounted on the bottle, the visual indicator being in electrical communication with the controller.

7. The baby bottle as recited in claim 1, further comprising at least one battery housed within the fluid-tight chamber, the at least one battery being in electrical communication with the motor, the thermoelectric element and the controller.

8. The baby bottle as recited in claim 7, further comprising a charging port mounted on the bottle for selectively recharging the at least one battery.

* * * * *